Oct. 9, 1962 — C. M. HOWARD ETAL — 3,057,205
MULTIVALVE FOR DETERMINING PRESSURE DISTRIBUTION ON AIR FOILS AND THE LIKE
Filed Aug. 17, 1959 — 2 Sheets-Sheet 1

INVENTORS
CHARLES M. HOWARD &
ROBERT M. JAMES &
BY HERMANN F. SCHNEIDER

ATTORNEYS

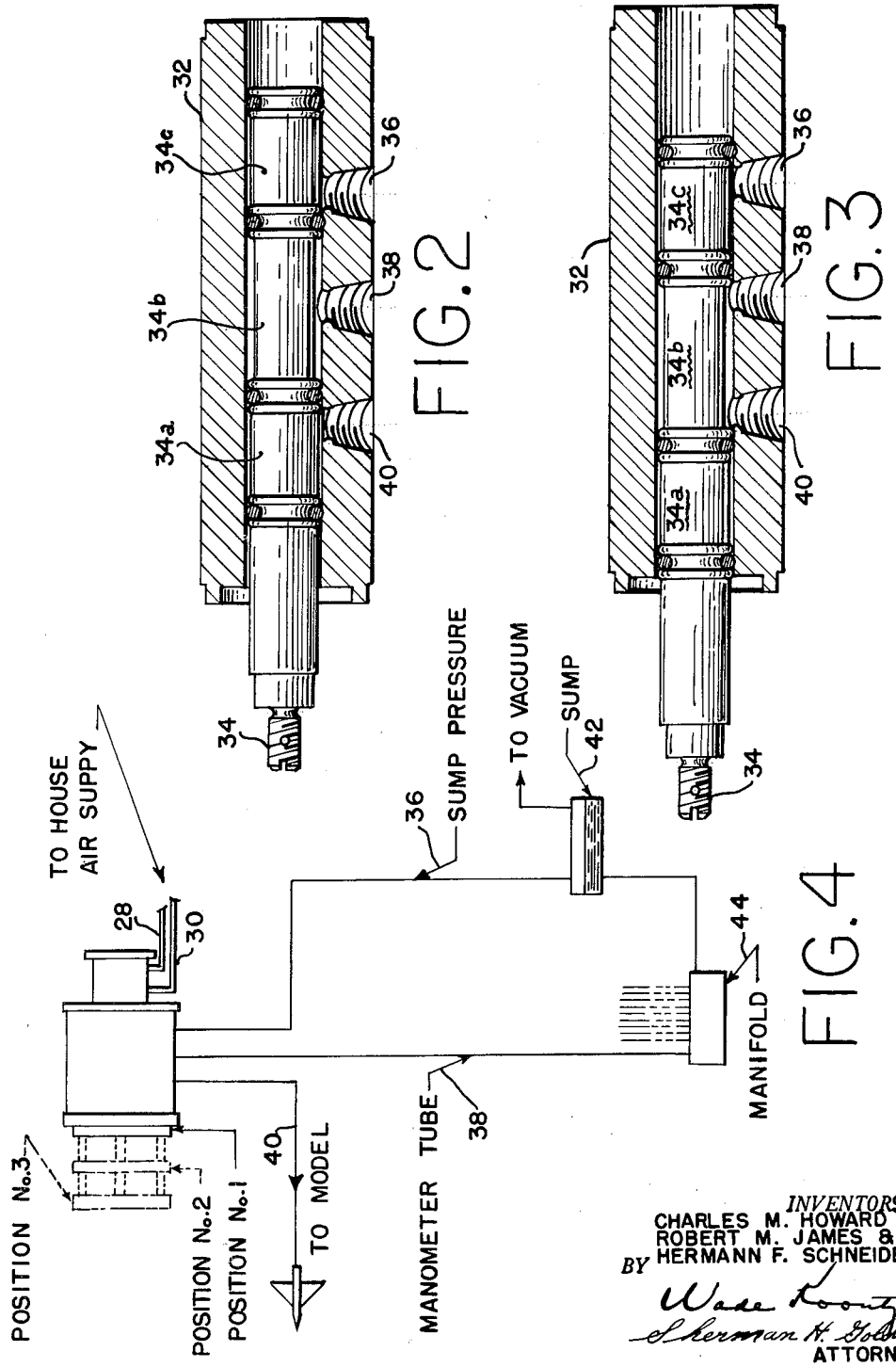

3,057,205
MULTIVALVE FOR DETERMINING PRESSURE
DISTRIBUTION ON AIR FOILS AND THE LIKE
Charles M. Howard, Shelbyville, and Robert M. James and Hermann F. Schneider, Tullahoma, Tenn., assignors to the United States of America as represented by the Secretary of the Air Force
Filed Aug. 17, 1959, Ser. No. 834,362
2 Claims. (Cl. 73—401)

This invention relates to a multivalve in which a common plate attached to a piston rod having two spaced pistons actuates simultaneously one or more three way valves. It is especially useful in conjunction with multiple manometers in determining pressure measurements on wind tunnel models and process air ducting.

In taking pressure measurements on models in wind tunnnels it is desirable to determine the pressure at as many points as possible. On an airplane wing, for instance, a hundred or more points on a single wing are necessary for proper analysis.

To supply one hundred or more manometers for such analysis would be cumbersome and expensive and it is now standard practice to provide banks of manometers of ten or more individual units to be connected successively to groups of points to be measured. Each bank, say of ten manometers, is then connected to the groups of ten points to be measured and through a suitable valve all ten manometers are connected and read at once. Since it is very expensive to operate a wind tunnel, and many models are awaiting their turn to be tested, it is a great advantage to be able to read the indicated pressures as rapidly as possible.

It is an object of this invention, therefore, to supply a means for quickly and accurately reading manometers used in testing models in wind tunnels.

It is a further object to supply a valve which will reduce the stabilization time between test points.

It is also an object to provide a valve which is easy to operate, requires a minimum of space and is inexpensive and easy to manufacture.

The above and still other objects, advantages and features of our invention will become apparent upon consideration of the following detailed description of one embodiment thereof, especially when taken in conjunction with the accompanying drawings, in which:

FIG. 2 is a sectional view of one of the valves shown in No. 2 position;

FIG. 3 is a sectional view of the same valve as in FIG. 2 in No. 3 position; and FIG. 4 is a schematic drawing of a typical model installation.

Like numerals refer to like parts throughout the drawings.

Figure 1:
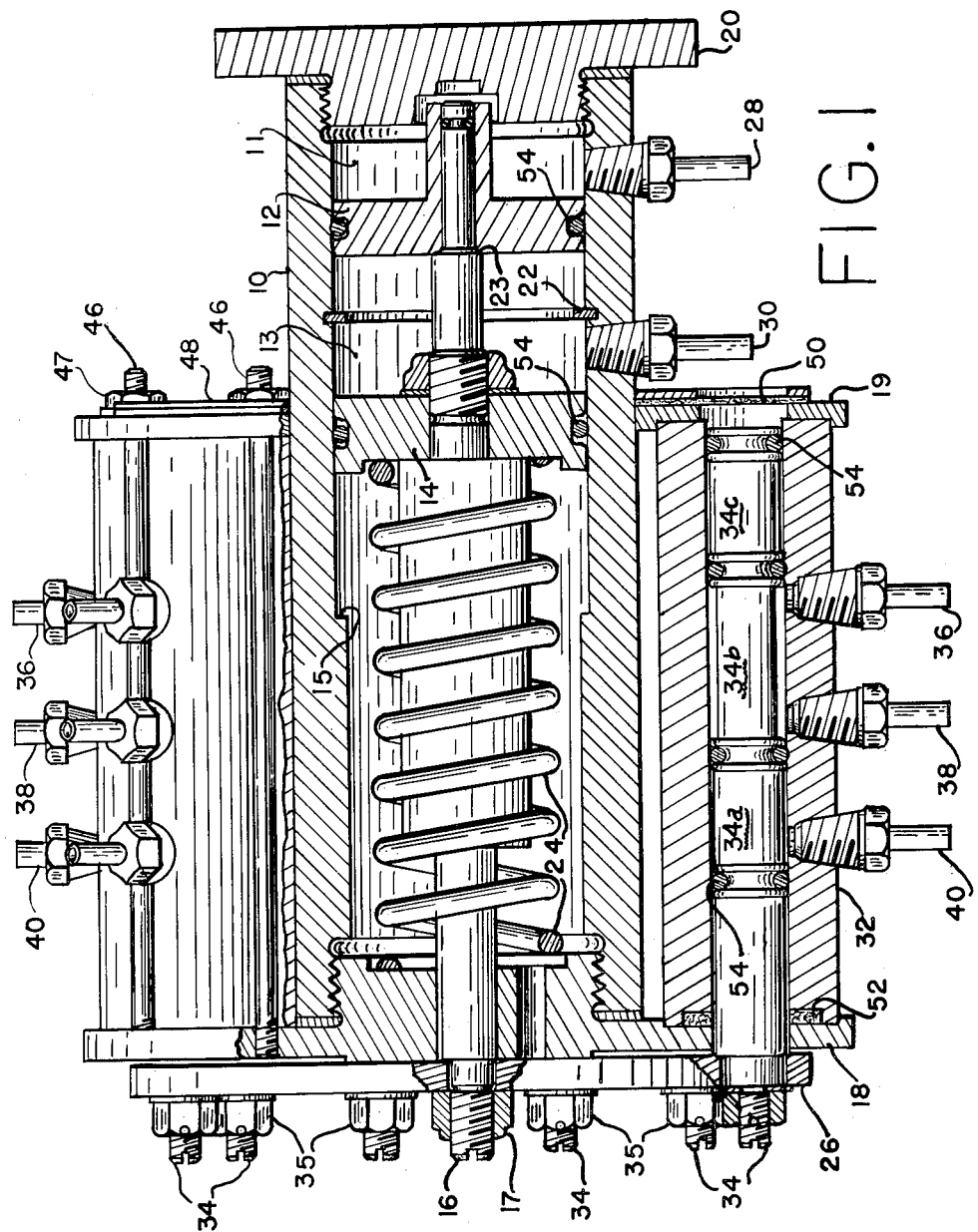
FIG. 1 is a partial sectional view showing the essential elements of the invention.

The numeral 10 designates a cylinder in which are two pistons 12 and 14 mounted on a piston rod 16. The cylinder 10 is closed at one end by a top plate 18 and at the other end by a bottom plug 20. Piston 14 is made fast to the piston rod 16 and moves with it, while piston 12 is free to slide on the rod when the said piston is stopped by a retaining ring 22. A hose fitting 28 is connected to a source of air pressure through a valve (not shown) and a second hose fitting 30 is connected through second valve (not shown) to a source of air pressure. When the valve connected to hose fitting 28 is opened the compressed air admitted to a chamber 11 forces piston 12 to the left against a shoulder 23 on rod 16 until the said piston comes to rest against the retaining ring 22. This motion carries the piston rod 16 and piston 14 with it to the left. When compressed air is admitted through valve fitting 30 to a chamber 13 the piston 14 and rod 16 are moved further to the left until stopped by a shoulder 15 in the cylinder 10. A compression spring 24, which is biased to resist the movement of the piston 14 to the left, then forces the pistons and the rod back to the original position when the air pressure in chambers 11 and 13 is released by the valves connected to valve fittings 28 and 30. The piston rod 16 is fastened at its forward end by a locknut 17 to a common plate 26. The plate 26, which moves with the piston rod 16, has fastened to it by locknuts 35 a series of valve pistons 34, ten in number in this embodiment, which move in cylinders 32. Each valve piston 34 is divided into four sections divided by oilrings 54. The three right hand sections are numbers 34a, 34b and 34c and all fit snugly inside of the cylinders 32 except 34b which is smaller than the inside diameters of cylinders 32 having an air space around it. Fitted in the cylinders 32, and opening into them, at equally spaced intervals, are three hose connectors 36, 38 and 40. As will be seen by reference to the schematic drawing in FIG. 4, 36 connects to a sump reference, 38 to a manometer tube which is one of ten connected to a manifold 44 and 40 to a point on a model to be measured. The cylinders 32 are made fast to the main cylinder 10 by connecting rods 46 running through a bottom plate 19 and screwed in top plate 18. A cover plate 48 covers the ends of cylinders 32 and is held in place by nuts 47. A seal 50 seals one end of the cylinders 32 and seals 52 the other end.

Operation of the device is as follows:

In the normal, or number 1 position, which is shown in FIG. 1, the model pressure 40, is trapped by the portion of piston 34 designated as 34a and the sump pressure 36, acts on the fluid of the manometer tube 38 through the air space between the cylinder wall 32 and the said piston. When air pressure is supplied to chamber 11 through tube 28 piston 12 is moved to the left until it is stopped by retaining ring 22. It carries piston rod 16 with it and a plate 26 which is attached to pistons 34. The pistons 34 are thus moved to position 2 as shown in FIG. 2 and the sump pressure through 36 is trapped by the portion of cylinder numbered 34c and the model pressure remains trapped by 34a. Manometer tube 38 remains connected to the air chamber around 34b and is stabilized before movement to the next position. Air pressure is allowed to remain in chamber 11 and the valve controlling the hose connection to chamber 13 is opened and piston 14 is driven to the shoulder 15 in cylinder 10, thus moving pistons 34 to the No. 3 position shown in FIG. 3. The sump pressure through 36 remains trapped by 34c and the model pressure through 40 acts on the manometer tube through 38. The model pressures are then read on the manometers. Air pressure is then released in chambers 11 and 13 and the spring 24 returns all pistons to the original No. 1 position shown in FIG. 1.

With this invention ten manometers are connected to a model and read at once by simply manipulating two valves connected to the main cylinder 10 and a compressed air source. Time is saved by the stabilization of the manometers by having them connected to the reference source before connection to the model pressure source.

It is to be understood that the above described arrangement is merely illustrative of the applications of the principles of the invention. Numerous other arrangements may be devised by those skilled in the art without departing from the spirit and scope of the invention.

We claim:

1. A device for use in conjunction with multiple manometers for taking accurate pressure measurements comprising a series of manometers, means for firstly connecting both ends of each of said manometers to a source of reference pressure, secondly, stabilizing said manometers by sealing off one end of said manometers, and thirdly connecting the said one end of each of said manometers with a source of pressure to be measured, said means comprising a main valve unit, a separate source of pressure to actuate said main valve unit, a series of piston valves arranged to be simultaneously actuated by said main valve to any one of three positions, each of said series of valves comprising a valve piston in a cylinder, first means connecting said cylinder with a source of reference pressure and one end of one of said manometers, seconds means connecting said cylinder with the other end of said one of said manometers, and third means connecting said cylinder with a source of pressure to be measured, said valve piston in said cylinder being so arranged as to connect said first means with said second means while isolating said third means when actuated in its first position by said main valve unit, upon actuation to its second position by said main valve, said piston isolates said first, second and third means from each other, and in its third position said piston connects said second and third means while maintaining said first means isolated.

2. A valve unit for control of a series of secondary valve units comprising a cylinder capped at one end, spaced stops on the wall of said cylinder, a piston rod for longitudinal movement in said cylinder, a first piston on said rod free to slide on said rod when said first piston is checked by the first said stop, a second piston fixed to said rod for movement therewith until stopped by the second of said stops, a source of pressure, means to connect said source of pressure to move said first piston to the first stop, means to connect the source of pressure to move said second piston to the second stop, and biasing means to return said pistons and said rod to the first position when the pressure on said pistons is released, wherein the series of secondary valve units comprise, a series of bored cylinders having valve pistons therein, the said pistons being attached to a common plate, said common plate being attached to said piston rod for movement therewith, each of said valve pistons having three sections, the outer sections of each of said valve pistons being in fluid tight engagement with the bore of its cylinder, the center section of said valve pistons being smaller than the bore diameter of its cylinder to provide an air space therein, three spaced ports in the wall of said bored cylinders the first of said ports being connected to a source of reference pressure, the second of said ports being connected to a measuring device and the third of said ports being connected to a source of pressure to be measured, which upon movement of the valve piston firstly connects the first of said ports to the second of said ports while isolating the third, secondly, isolates said ports from each other, and thirdly, connects said third port with the second of said ports to measure the pressure on said third port.

References Cited in the file of this patent
UNITED STATES PATENTS

| | | |
|---|---|---|
| 787,479 | Tanner | Apr. 18, 1905 |
| 2,299,211 | Clench | Oct. 20, 1942 |
| 2,390,534 | Heuver | Dec. 11, 1945 |
| 2,420,896 | Meyers | May 20, 1947 |
| 2,562,494 | Hejduk | July 31, 1951 |
| 2,568,528 | Welte | Sept. 18, 1951 |
| 2,665,713 | Crookston et al. | Jan. 12, 1954 |
| 2,719,426 | Lamb et al. | Oct. 4, 1955 |
| 2,792,020 | Lieser | May 14, 1957 |